UNITED STATES PATENT OFFICE.

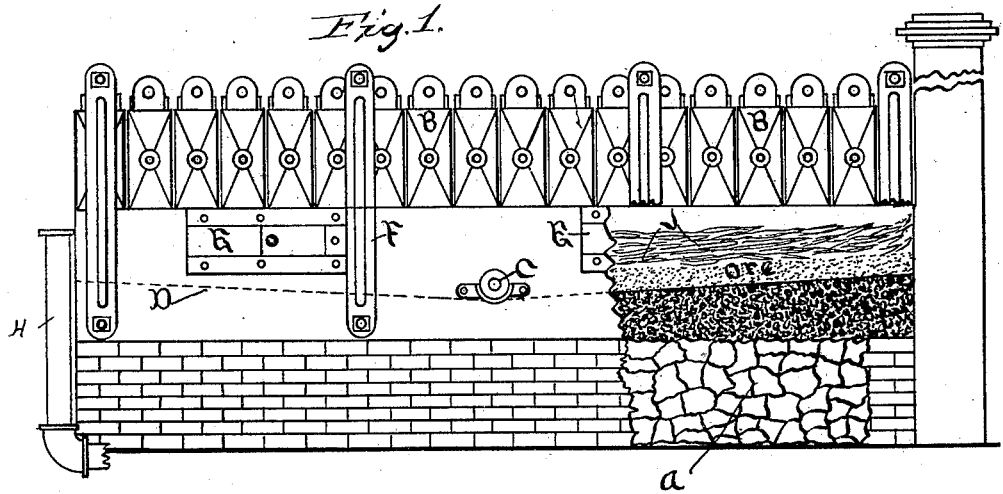
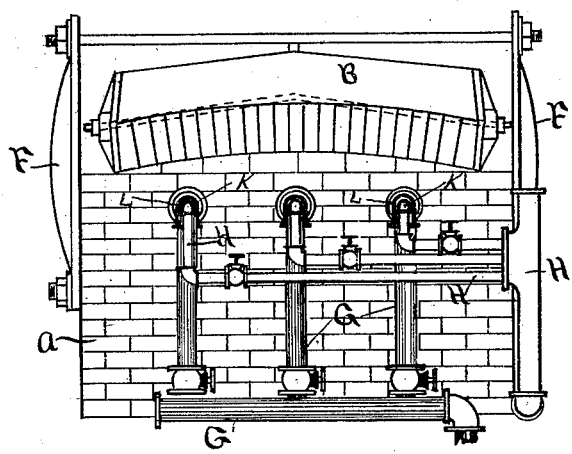
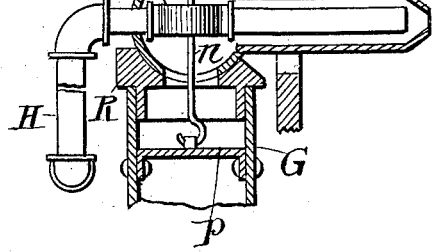

DEXTER REYNOLDS, OF ALBANY, NEW YORK.

PROCESS OF PRODUCING STEEL DIRECT FROM ORE.

SPECIFICATION forming part of Letters Patent No. 686,130, dated November 5, 1901.

Application filed August 14, 1899. Serial No. 727,155. (No specimens.)

*To all whom it may concern:*

Be it known that I, DEXTER REYNOLDS, a citizen of the United States, residing at Albany, New York, have invented certain new and useful Improvements in Producing Iron and Steel Direct from Ore; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My improvement relates to a more economical process for the production of steel direct from the ore. The ores in use are chiefly magnetic oxids ($Fe_3O_4$) or hematites, ($Fe_2O_3$.)

The process is based on the well-known chemical fact that the only difference between steel and pig or cast iron is in the amount of carbon contained in each, steel containing from .50 to 1.9 per cent. and pig two per cent. and over; also, on another well-known chemical fact that oxygen and carbon have each an affinity for iron, but a greater affinity for each other; also, on the well-known fact that chemical action takes place only at the point of contact, and assuming that the contents of a blast-furnace as charged will average at least four-inch cubes and reducing such cubes to a finer state—say to pass a sixteen mesh—and mixing them will increase the surface and points of contact over two-hundred fold; also, on the further well-known fact that short of electricity oxid of iron, the main constituent of all the above-named ores, as also carbon, are each *per se* infusible, and passing a neutral flame (produced from petroleum, gas, or otherwise) of any intensity and for any length of time over either by itself would produce no change whatever; but if charcoal, coal, or coke is placed in contact with oxid-of-iron ores (all crushed and mixed) distributed in a furnace and heated by a neutral flame—say simply to a red heat—the oxygen of the one will readily unite with the carbon of the other and pass off up the chimney (and can go off in no other way) as carbon-monoxid or carbon-dioxid gas, preferably the latter, and when the oxygen has all been removed from the iron, and not before, any surplus of carbon remaining will unite with the iron and carbonize it to the extent the remaining carbon will suffice.

The process of making steel ingots proposed by me is alike for all the above-named ores. It is to mix with the ore sufficient carbon in the form of charcoal, coal, or coke to first deoxidize the iron and then duly carbonize it into steel and with flux sufficient to remove impurities, the ore, charcoal, coal, or coke, and flux being all brought to a fine state, so as to assure their more intimate mixture and more speedy action on each other when suitably heated. This mixture of crushed ore, carbon, and flux is to be distributed in a suitable furnace in any suitable manner, one way being shown in the drawings, the furnace having closable openings preferably made in each side to admit of the introduction and stirring when desired of the contents of the furnace, and means for the removal of slag, and a tap-hole C, and also provision, preferably at the end opposite to the chimney, for the admission of heat over and upon the contents of the furnace, and provision to see and regulate the character of the heating-flame and of the metal on the bed of the furnace, using only the surface action of a neutral heating-flame, preferably from petroleum, supplied by one or more hydrocarbon-burners, of which there are several in market.

The intensity of the heat need at first be only sufficient to promote and effect with suitable stirring the rapid deoxidation and escape up the chimney of the products thereof, then the due carbonization of the metal, and then by increasing the temperature fusing the metal so it can be poured into ingots of steel.

Should any particles or parts of particles of ore under the lesser temperature not be deoxidized and duly carbonized, they will be when the carbonized particles have been fused, and all will be brought to a uniform state.

As the contents of the furnace in ore, charcoal, coal, or coke, and flux and its manipulation under a neutral flame are proposed to be the same with the same quality of ore in all cases, a short practice should soon demonstrate the only change necessary to produce the quality of steel desired—viz., an addition to or a reduction of the amount of charcoal, coal, or coke found to be practically required therefor, or the metal while fluid before pouring can be speedily tested by any well-known method and brought where necessary to the standard desired by the addition thereto of the requisite amount and character of material to increase or diminish the carbon therein.

I have illustrated one form of furnace whereby my process may be carried out in the accompanying drawings, wherein—

Figure 1 shows a side elevation of this form of furnace with a portion of the side broken away, showing a portion of the interior; Fig. 2, an end elevation thereof; and Fig. 3, a vertical sectional view of a portion of one of the burners, showing the ball-joint whereby I am enabled by tipping the nozzle downward to direct the full blast of the blowpipe-flame directly down upon the contents of the furnace at nearly right angles.

A particular description of the furnace shown is as follows:

A shows a bed of rubble inclosed in brickwork topped with a bed of fire-clay or other resisting material, upon which the ore is spread with the other material used, as hereinbefore described, the floor D of the furnace being molded from all sides downward to one point, so as to allow the molten metal to be drawn off at the tap C.

J shows the flame from the oil-burners as it passes over the surface of the ore, flux, and carbonaceous material.

E shows closable openings in the side of the furnace through which the material may be introduced into the furnace and stirred when desired, F buckstaves arranged to hold the walls of the furnace in place, and B bungs with which to top or cover the furnace-chamber, arranged to be removed and replaced when desired.

In the use of oil for fuel (gas may be used, if desired) I use a system of oil-pipes G and a system of flexible pipes H, preferably of rubber, the air-pipes supplying air under pressure to the oil-burners and arranged to spray the oil into the furnace-chamber in the usual manner, and my burners are preferably of the Lefferts's variety shown in Letters Patent bearing date December 4, 1883, No. 289,424, using air, preferably, instead of steam for spraying the oil; but I have added to the burner a ball-joint for the purposes hereinbefore stated, K showing the ball set in a socket R, attached to the pipe G and held rotatably in the socket by the rod N and the nut O, the air-pipe H passing through the ball and having a curve H' therein to avoid the rod N, said rod being hooked or otherwise movably attached to the bridge P, this arrangement allowing of an upward-and-downward tipping motion and also a lateral motion to the burner-nozzle, whereby the flame may be directed downward and caused to make initial contact with the metal at practically right angles, thus subjecting the metal to, first, a flame that lies over and skims the surface of the metal, as in a reverberatory furnace, and, second, subjecting the metal to attack by the initial impact of a blowpipe-flame striking it at practically right angles, whereby the metal is finally fused and rendered pourable, this blowpipe-flame so directed resulting in a higher temperature on the metal and a great saving of time and fuel in the melting or fusing of the metal. These burners are so well known that a particular description thereof is not deemed necessary; but at K, I have introduced a ball-joint of the common and well-known variety, whereby the spraying end or nozzle of the burners may be easily and at will turned in any direction or at any angle, so as to direct the sprayed oil and flame directly upon any part or portion of the ore or in any direction desired, as well as to cause it to act over the entire surface thereof, as shown at J, and the burners are thus also arranged so that when I deem it necessary I can direct a powerful and concentrated flame upon any spot in the furnace-chamber, or, if it is deemed desirable, I can by increasing or reducing the air-supply or increasing or reducing the oil-flow force the flames and oil directly upon the surface of the metal in order that I may in this way, if I desire, increase or diminish the amount of carbon desired to be had in the fluid metal. The burners are introduced through openings L in the furnace-wall, these openings being, preferably, a trifle larger than the burners to allow of seeing beyond them and into the furnace, so that the operations in the furnace may be witnessed from this point.

Having described my invention, what I claim as new, and desire to secure by Letters Patent, is—

The process of treating oxid-of-iron ores to produce therefrom wrought iron or steel which consists, first, in mixing granulated ore with sufficient granulated carbonaceous material to deoxidize the ore and then duly carbonize the iron in it, and granulated fluxes suitable in character and amount to remove impurities; second, introducing into and distributing this mixture in a suitable closed furnace; third, subjecting it to the surface action of a neutral heating-flame practically as in a reverberatory furnace until the oxid of iron is deoxidized and the iron then duly carbonized; fourth, subjecting the resultant mass to the forcible direct impact of a blast-flame directed down and upon the same until the metal is fused, and, fifth, separating the slag therefrom, all done in one and the same closed furnace, substantially as described.

In testimony whereof I affix my signature in presence of two witnesses.

DEXTER REYNOLDS.

Witnesses:
W. M. BROWN,
A. M. TURNER.